US012652452B1

(12) United States Patent
Silvy et al.

(10) Patent No.: US 12,652,452 B1
(45) Date of Patent: Jun. 9, 2026

(54) IMAGE CAPTURE DEVICE WITH TRACKING CAPABILITY

(71) Applicant: GoPro, Inc., San Mateo, CA (US)

(72) Inventors: Noam Silvy, San Mateo, CA (US);
Thomas Carton, San Mateo, CA (US);
Gabriel Mahe, San Mateo, CA (US);
Séraphin Cyrille Philippe Bonnaffé,
San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 262 days.

(21) Appl. No.: 18/603,765

(22) Filed: Mar. 13, 2024

(51) Int. Cl.
| | |
|---|---|
| *G06K 9/00* | (2022.01) |
| *H04N 23/55* | (2023.01) |
| *H04N 23/60* | (2023.01) |
| *H04N 23/61* | (2023.01) |

(52) U.S. Cl.
CPC .............. *H04N 23/61* (2023.01); *H04N 23/55* (2023.01); *H04N 23/64* (2023.01)

(58) Field of Classification Search
CPC ........ H04N 23/61; H04N 23/55; H04N 23/64; H04N 23/695; H04N 23/60; H04N 23/6811; H04N 23/683; H04N 23/66; H04N 23/00; G06V 20/13; G06V 20/17; G06V 20/40; G06V 20/52; G06V 10/00; G06V 20/00; G06V 2201/00; G06V 20/10; G06T 2207/10032; G06T 2207/30232
See application file for complete search history.

(56) References Cited

U.S. PATENT DOCUMENTS

| | | | | |
|---|---|---|---|---|
| 10,944,893 | B1 * | 3/2021 | Daulton ................ | G06F 1/1632 |
| 2016/0212327 | A1 * | 7/2016 | Dietel .................... | H04N 23/63 |

FOREIGN PATENT DOCUMENTS

| | | | | |
|---|---|---|---|---|
| EP | 3908026 | A1 * | 11/2021 | ............. G06F 21/32 |

OTHER PUBLICATIONS

Lioyd ("How to Connect Bluetooth Accessories to Your iPhone 6", SXL Media Group, Inc., published on Feb. 16, 2016, 4 pages) discloses a way to connect Bluetooth accessories to iPhone 6). (Year: 2016).*

* cited by examiner

*Primary Examiner* — Duy M Dang
(74) *Attorney, Agent, or Firm* — Esplin & Associates, PC

(57) ABSTRACT

A user may carry a computing device. Communication between the computing device and an image capture device may be used to determine when the image capture device becomes separated from the computing device. When the image capture device becomes separated from the computing device, the operation(s) of the image capture device may be changed to assist the user in locating the image capture device. Information on location of the image capture device may be provided to the user through the computing device to assist the user in locating the image capture device.

20 Claims, 5 Drawing Sheets

System 10

System 10

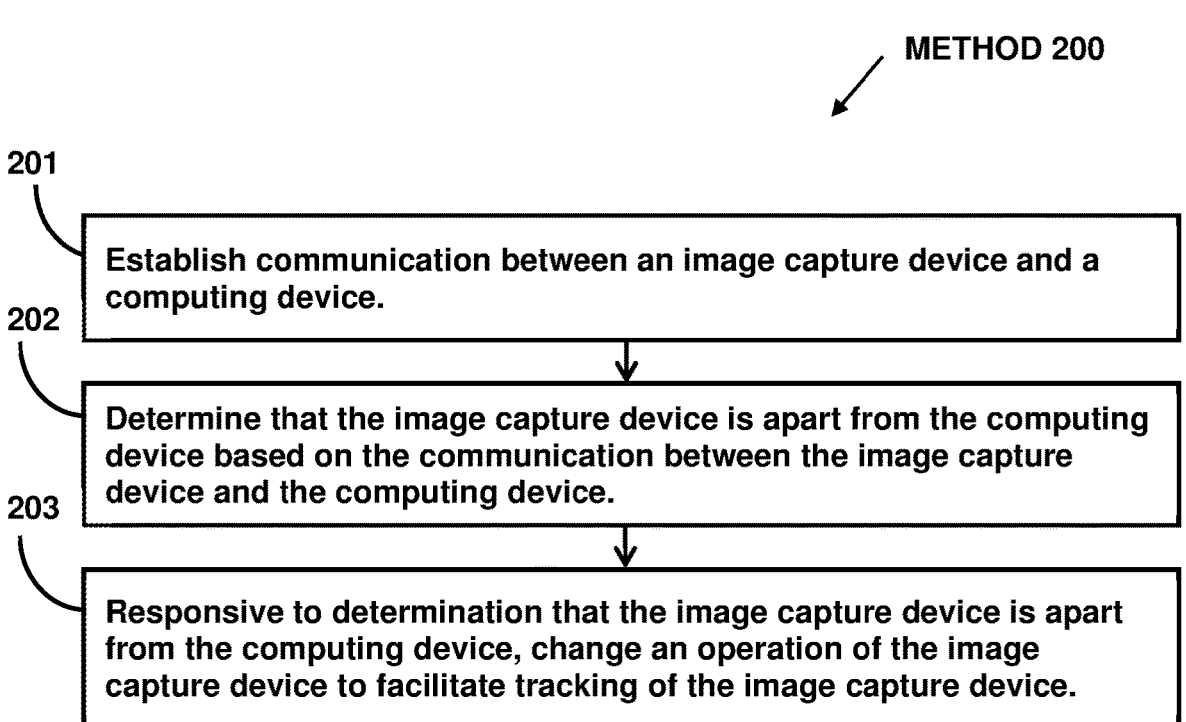

METHOD 200

201

Establish communication between an image capture device and a computing device.

202

Determine that the image capture device is apart from the computing device based on the communication between the image capture device and the computing device.

203

Responsive to determination that the image capture device is apart from the computing device, change an operation of the image capture device to facilitate tracking of the image capture device.

FIG. 2 image capture
device 300 image sensor 306 transceiver 308 processor 310 field of view 305 optical element
304 housing 302 image capture device 402          computing device 404 communication 406 image capture device 402 computing device 404

IMAGE CAPTURE DEVICE WITH TRACKING CAPABILITY

FIELD

This disclosure relates to an image capture device that changes its operation to facilitate tracking of the image capture device.

BACKGROUND

A user may accidentally lose an image capture device. Finding the lost image capture device may be difficult and time consuming.

SUMMARY

This disclosure relates to an image capture device with tracking capability. The image capture device may include a housing. The housing may carry one or more of an optical element, an image sensor, a transceiver, and/or other components. The optical element may guide light within a field of view to the image sensor. The image sensor may generate a visual output signal conveying visual information based on light that becomes incident thereon. The visual information may define visual content. The transceiver may communicate with a computing device. Communication between the image capture device and the computing device may be established via the transceiver. The communication between the image capture device and the computing device may indicate proximity of the image capture device to the computing device. The image capture device being apart from the computing device may be determined based on the communication between the image capture device and the computing device and/or other information. Responsive to determination that the image capture device is apart from the computing device, one or more operations of the image capture device may be changed to facilitate tracking of the image capture device.

A housing may carry one or more components of an image capture device. The housing may carry (be attached to, support, hold, and/or otherwise carry) one or more of an electronic storage, an optical element, an image sensor, a transceiver, a processor, and/or other components.

The electronic storage may store information relating to the image capture device, information relating to components of the image capture device, visual information, information relating to visual content captured by the image capture device, information relating to a computing device, information relating to communication with the computing device, information relating to proximity of the image capture device to the computing device, information relating to operations of the image capture device, information relating to tracking of the image capture device, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The transceiver may be configured to communicate with a computing device. In some implementations, the computing device may include a mobile device carried by a user of the image capture device.

The processor(s) may be configured by machine-readable instructions. Executing the machine-readable instructions may cause the processor(s) to facilitate image capture device tracking. The machine-readable instructions may include one or more computer program components. The computer program components may include one or more of a communication component, and/or other computer program components.

The communication component may be configured to establish, via the transceiver, communication between the image capture device and the computing device. The communication between the image capture device and the computing device may indicate proximity of the image capture device to the computing device.

In some implementations, the communication between the image capture device and the computing device may include Bluetooth communication.

The image capture device being apart from the computing device may be determined based on the communication between the image capture device and the computing device, and/or other information. The image capture device being apart from the computing device may be determined by the image capture device, the computing device, and/or other devices.

In some implementations, the image capture device may be determined to be apart from the computing device based on a low signal strength of the communication between the image capture device and the computing device, and/or other information. In some implementations, the image capture device may be determined to be apart from the computing device based on a loss of the communication between the image capture device and the computing device, and/or other information.

Responsive to determination that the image capture device is apart from the computing device, one or more operations of the image capture device may be changed. The operation(s) of the image capture device may be changed to facilitate tracking of the image capture device. The operation(s) of the image capture device may be changed by the image capture device, the computing device, and/or other devices.

In some implementations, the change(s) in the operation(s) of the image capture device to facilitate tracking of the image capture device may include one or more changes in sound produced by the image capture device.

In some implementations, the change(s) in the operation(s) of the image capture device to facilitate tracking of the image capture device may include one or more changes in information transmitted by the image capture device to the computing device.

In some implementations, the change(s) in the operation(s) of the image capture device to facilitate tracking of the image capture device may include one or more changes in media item capture by the image capture device. The media item capture by the image capture device may change from video capture to image capture. One or more images captured by the image capture device during the image capture may be transmitted to the computing device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for tracking an image capture device.

DETAILED DESCRIPTION

Figure 1:
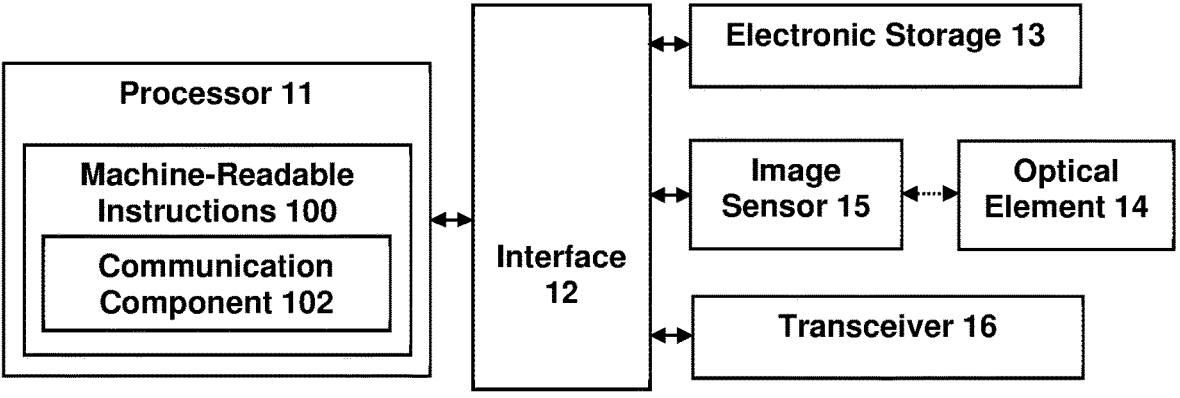
FIG. 1 illustrates an example system for tracking an image capture device.

FIG. 1 illustrates a system 10 for tracking an image capture device. The system 10 may include one or more of a processor 11, an interface 12 (e.g., bus, wireless interface), an electronic storage 13, an optical element 14, an image sensor 15, a transceiver 16, and/or other components. The system 10 may include and/or be part of an image capture device. The image capture device may include a housing, and one or more of the electronic storage 13, optical element 14, the image sensor 15, the transceiver 16, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content.

The transceiver 16 may communicate with a computing device. Communication between the image capture device and the computing device may be established via the transceiver 16. The communication between the image capture device and the computing device may indicate proximity of the image capture device to the computing device. The image capture device being apart from the computing device may be determined based on the communication between the image capture device and the computing device and/or other information. Responsive to determination that the image capture device is apart from the computing device, one or more operations of the image capture device may be changed to facilitate tracking of the image capture device.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to a computing device, information relating to communication with the computing device, information relating to proximity of the image capture device to the computing device, information relating to operations of the image capture device, information relating to tracking of the image capture device, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, the image sensor 15, and/or the transceiver 16 of the system 10 may be carried by the housing of the image capture device. The housing of the image capture device may carry other components of the system 10, such as the processor 11. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
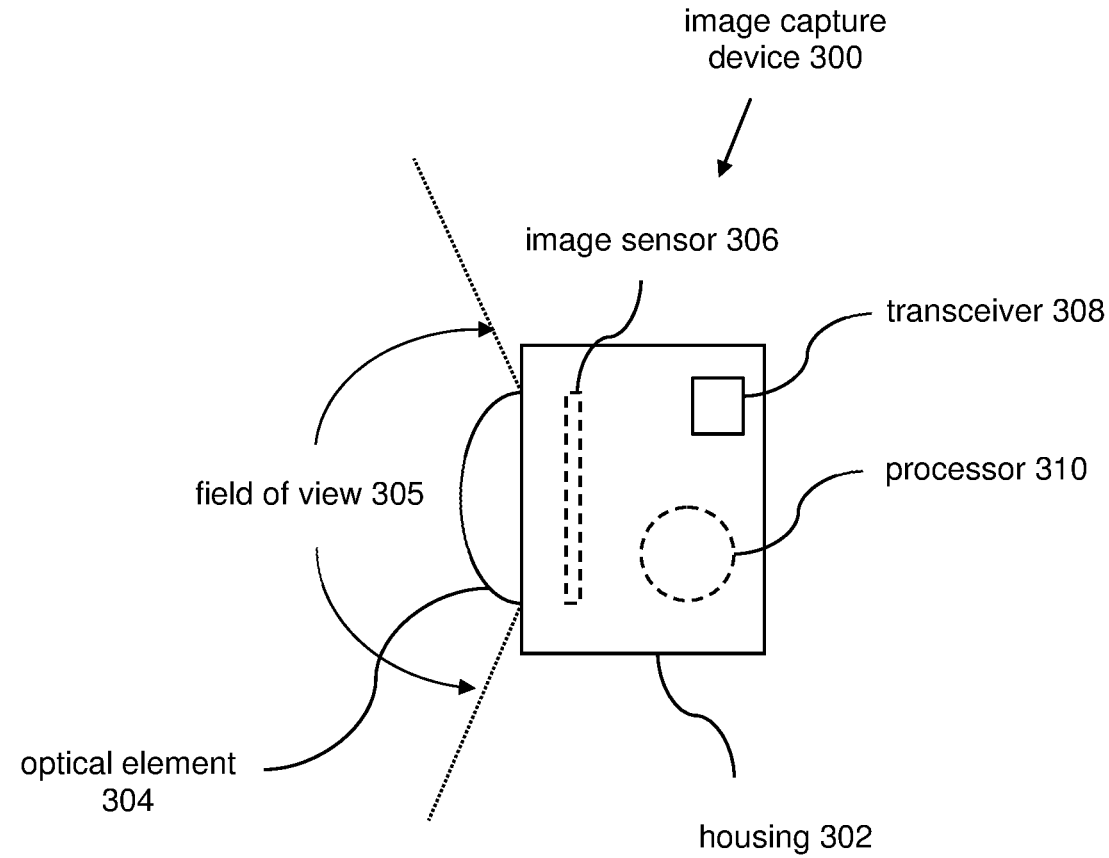
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, a transceiver 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The transceiver 308 may be the same as, be similar to, and/or correspond to the transceiver 16.

The image capture device 300 may include other components not shown in FIG. 3. The image capture device 300 may not include one or more components shown in FIG. 3. For example, the image capture device 300 may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The transceiver 308 may be configured to communicate with one or more computing devices. A computing device may refer to a piece of electronic equipment controlled by a processor (e.g., CPU). In some implementations, a computing device may include a mobile device carried by a user of the image capture device 300. A mobile device may refer to a piece of portable electronic equipment. A mobile device may refer to a computing device that is small/light enough to hold and/or operate in the hand. Examples of a mobile device include a smartphone, a smartwatch, a smart tracker/tag, and a tablet. Other mobile devices are contemplated.

A mobile device may or may not be paired with the image capture device 300. A mobile device paired with the image capture device 300 may include a mobile device that can communicate with the image capture device. A mobile device paired with the image capture device 300 may include a mobile device that can send information to the image capture device 300 and/or receive information from the image capture device 300. A mobile device paired with the image capture device 300 may include a mobile device that has been linked with the image capture device 300.

The transceiver 308 may refer to equipment used to communicate information. The transceiver 308 may refer to equipment that can transmit and/or receive information. The transceiver 308 may include one or more transmitters and/or one or more receivers. A transmitter may refer to equipment used to generate and/or transmit electromagnetic waves carrying information. A transmitter may be configured to transmit information via the electromagnetic waves. A transmitter may generate and/or transmit electromagnetic waves based on one or more wireless communication technologies, such as WiFi and/or Bluetooth. A transmitter may be configured to transmit information from one computing device to another computing device. A transmitter may encode information within one or more signals transmitted by the transmitter. A receiver may refer to equipment used to receive and/or convert electromagnetic waves carrying information. A receiver may be configured to receive information via the electromagnetic waves. A receiver may receive and/or convert electromagnetic waves based on one or more wireless communication technologies, such as WiFi and/or Bluetooth. A receiver may be configured to receive information for one computing device from another computing device. A receiver may receive signals transmitted by a transmitter.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A user may lose an image capture device. For example, a user may drop the image capture device while recording images/video. For example, the image capture device may be attached to the user (e.g., attached to a helmet worn by the user, attached to the user's body using a strap/mount) and become dislodged during the activity. As another example, the user may leave the image capture device at a location and forget to take the image capture device when leaving the location.

The present disclosure enables the user to be notified when an image capture device becomes separated from a computing device (e.g., a mobile device carried by the user of the image capture device). The present disclosure enables the user to locate the image capture device after it has become separated from the computing device. The user may carry the computing device. Communication between the computing device and the image capture device may be used to determine when the image capture device becomes separated from the computing device. When the image capture device becomes separated from the computing device, the operation(s) of the image capture device may be changed to assist the user in locating the image capture device. Information on location of the image capture device may be provided to the user through the computing device to assist the user in locating the image capture device.

For example, the image capture device may periodically send signals (e.g., Bluetooth signals) to the computing device (e.g., a mobile device carried by the user) and/or vice versa. The signals received by the image capture device and/or the computing device may be used to determine when the image capture device is apart from the computing device. For example, the image capture device may be determined to be apart from the computing device based on the signal(s) being lost (e.g., the mobile device/image capture device not receiving the signal(s) from the other device) or based on the low signal strength (e.g., the strength of the signal(s) received from the other device being lower than a threshold strength value).

When the image capture device is determined to be apart from the computing device, the computing device and/or the image capture device may be operated to notify the user that the image capture device has been separated from the computing device/the user and/or to assist the user in locating the image capture device. For example, the computing device may present a notification on an electronic display that the image capture device is apart from the computing device. The computing device and/or the image capture device may make sound (e.g., beeping at maximum volume every N seconds) and/or move (e.g., vibrate). The sound and/or the movement made by the image capture device may help the user to locate the image capture device.

The computing device may present information on an electronic display that shows that last known location of the image capture device. For instance, the computing device may present a map with a mark on the last known location of the image capture device. The last known location of the image capture device may be determined based on communication between the image capture device and the computing device. For example, the image capture device may send its GPS location to the computing device, and the computing device may present the last received GPS location of the image capture device on an electronic display. As another example, the computing device may know its GPS locations and use its GPS location from the last time the computing device received a signal from the image capture device as the last known location of the image capture device.

The computing device may present information on an electronic display that shows the proximity of the computing device to the image capture device. For example, after the communication between the computing device and the image capture device has been lost/dropped below threshold strength value, the communication between the computing device and the image capture device has been restored/rise above the threshold strength value. The strength of the communication between the computing device and the image capture device may be used to determine the proximity of the computing device to the image capture device. Stronger signal strength may indicate closer distance while weaker signal strength many indicate farther distance. Changes in the strength of the communication between the computing device and the image capture device may be used to determine whether the two devices are getting closer or farther apart, information on whether the two devices are getting closer or farther apart may be presented on an electronic display.

The tracking of the image capture device via communication between the image capture device and the computing device may be started automatically or based on user input. For example, the user may interact with the image capture device and/or the computing device to start the tracking. For instance, the user may engage a tracking option on the image capture device or an application running on the computing device to start the tracking.

Referring back to FIG. 1, the processor 11 (or one or more components of the processor 11) may be configured to obtain information to facilitate image capture device tracking. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate image capture device tracking. The machine-readable instructions 100 may include one or more computer program components. The machine-readable instructions 100 may include one or more of a communication component 102, and/or other computer program components.

The communication component 102 may be configured to establish, via the transceiver 16, communication between the image capture device and the computing device. Establishing communication between the image capture device and the computing device may include starting, setting up, monitoring, and/or otherwise establishing communication between the image capture device and the computing device. The communication between the image capture device and the computing device may include transmission of information from the image capture device to the computing device and/or transmission of information from the computing device to the image capture device. The communication between the image capture device and the computing device may include reception of information from the image capture device by the computing device and/or reception of information from the computing device by the image capture device. The communication between the image capture device and the computing device may include transmission of one or more signals by the image capture device and reception of the transmitted signal(s) by the computing device. The communication between the image capture device and the computing device may include transmission of one or more signals by the computing device and reception of the transmitted signal(s) by the image capture device.

In some implementations, the communication between the image capture device and the computing device may include Bluetooth communication. In some implementations, the communication between the image capture device and the computing device may include WiFi communication. Use of other types of communication is contemplated.

In some implementations, the frequency of communication between the image capture device and the computing device may be static. For example, the frequency with which one device sends a signal to the other device and/or the frequency with which one device checks to see if it received/can receive a signal from the other device may not change.

In some implementations, the frequency of communication between the image capture device and the computing device may be dynamic. For example, the frequency with which one device sends a signal to the other device and/or the frequency with which one device checks to see if it received/can receive a signal from the other device may change. For instance, the frequency of communication between the image capture device and the computing device may change based on movement of the image capture device and/or the computing device. The frequency of communication between the image capture device and the computing device may increase based on faster movement of the image capture device and/or the computing device. The frequency of communication between the image capture device and the computing device may decrease based on slower movement of the image capture device and/or the computing device. For example, when the image capture device is not moving, the frequency of communication between the image capture device and the computing device may be a certain rate. When the image capture device begins to move (e.g., based on position sensor readings of the image capture device), the frequency of communication between the image capture device and the computing device may be increased to be faster than the original rate.

The communication between the image capture device and the computing device may indicate the proximity of the image capture device to the computing device. The proximity of the image capture device to the computing device may refer to nearness in place/space of the image capture device and the computing device. The proximity of the image capture device to the computing device may refer the distance between the image capture device and the computing device. The communication between the image capture device and the computing device indicating the proximity of the image capture device to the computing device may include the communication between the image capture device and the computing device indicating how close/far the image capture device is to the computing device, and vice versa.

In some implementations, the communication between the image capture device and the computing device may be used to determine whether (1) the image capture device is with the computing device, or (2) the image capture device is apart from the computing device (qualitative measure of proximity). For example, based on one device having received a signal from the other device within a threshold duration of time, the image capture device may be determined to be with the computing device. Based on one device having received a signal from the other device within a threshold duration of time, the image capture device may be determined to be sufficiently close to the computing device that the image capture device is not considered to be lost. Based on one device not having received a signal from the other device within a threshold duration of time, the image capture device may be determined to be apart from the computing device. Based on one device not having received a signal from the other device within a threshold duration of time, the image capture device may be determined to be sufficiently far from the computing device that the image capture device is considered to be lost.

In some implementations, the communication between the image capture device and the computing device may be used to determine values of proximity between the image capture device and the computing device (quantitative measure of proximity). The strength of the communication between the image capture device and the computing device may be used to determine how far/close the image capture device is to the computing device. The strength of the communication between the image capture device and the computing device may be used as a quantitative measure of distance between the image capture device and the computing device. The strength of the signal(s) received by one device may be used to determine how far/close the image capture device is to the computing device. Whether the image capture device is with or apart from the computing device may be determined based on the strength of the communication between the image capture device and the computing device. Based on the strength of the communication/signal(s) being greater than a threshold strength value, the image capture device may be determined to be with the computing device. Based on the strength of the communication/signal(s) being greater than a threshold strength value, the image capture device may be determined to be sufficiently close to the computing device that the image capture device is not considered to be lost. Based on the strength of the communication/signal(s) being lower than a threshold strength value, the image capture device may be determined to be apart from the computing device. Based on the strength of the communication/signal(s) being lower than a threshold strength value, the image capture device may be determined to be sufficiently far from the computing device that the image capture device is considered to be lost.

Figure 4A:
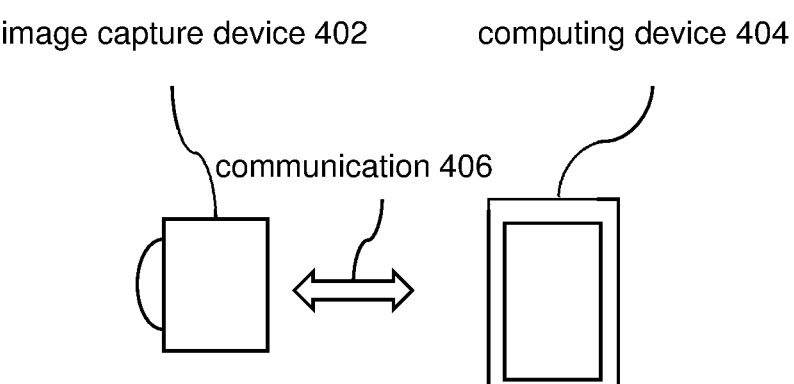
FIG. 4A illustrates an example communication between an image capture device and a computing device.
Figure 4B:
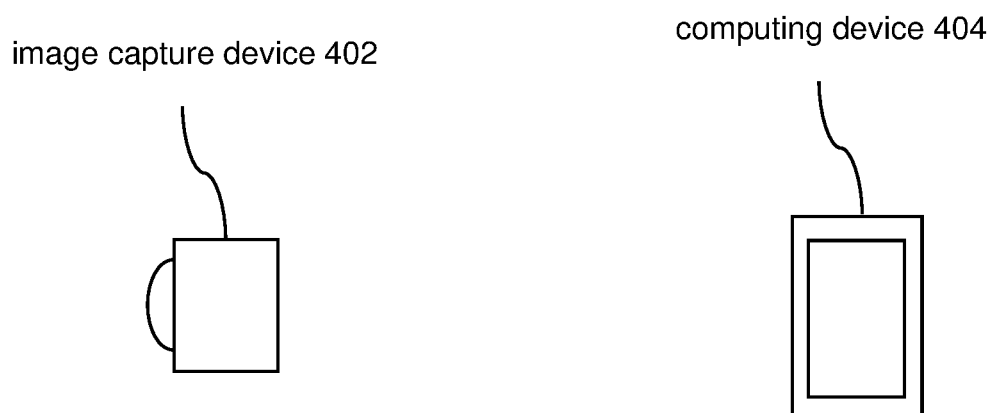
FIG. 4B illustrates an example loss of communication between an image capture device and a computing device.

FIGS. 4A and 4B illustrate example scenarios of communication between an image capture device 402 and a computing device 404. In FIG. 4A, communication 406 may be established between the image capture device 402 and the computing device 404. The communication 406 between the image capture device 402 and the computing device 404 may include the image capture device 402 transmitting signal(s) to the computing device 404 and/or the computing device 404 transmitting signal(s) to the image capture device 402. The communication 406 between the image capture device 402 and the computing device 404 may be used to determine the proximity of the image capture device 402 to the computing device 404. The communication 406 between the image capture device 402 and the computing device 404 may be used to determine whether or not the image capture device 402 is apart from the computing device 404.

For example, the image capture device 402 may be determined to be with the computing device 404 based on the existence of the communication 406 between the image capture device 402 and the computing device 404. Reception of a signal from the image capture device 402 by the computing device 404, and/or vice versa, within a threshold duration of time may indicate that the image capture device 402 is with the computing device 404. In FIG. 4B, the communication 406 between the image capture device 402 and the computing device 404 may be lost. Loss of the communication 406 between the image capture device 402 and the computing device 404 may indicate that the image capture device 402 is apart from the computing device 404.

As another example, the image capture device 402 may be determined to be with or apart from the computing device

404 based on the strength of the communication 406 between the image capture device 402 and the computing device 404. The strength of the communication 406 between the image capture device 402 and the computing device 404 being greater than a threshold strength value may indicate that the image capture device 402 is with the computing device 404. The strength of the communication 406 between the image capture device 402 and the computing device 404 being lower than a threshold strength value may indicate that the image capture device 402 is apart from the computing device 404.

The image capture device being apart from the computing device may be determined based on the communication between the image capture device and the computing device, and/or other information. Determining that the image capture device is apart from the computing device may include ascertaining, calculating, computing, establishing, and/or otherwise determining that the image capture device is apart from the computing device.

In some implementations, the image capture device may be determined to be apart from the computing device based on a low signal strength of the communication between the image capture device and the computing device, and/or other information. A low signal strength of the communication between the image capture device and the computing device may refer to the strength of the communication between the image capture device and the computing device that is below a threshold strength value. Based on the strength of the received signal being below a threshold strength value, the image capture device may be determined to be apart from the computing device.

In some implementations, the image capture device may be determined to be apart from the computing device based on a loss of the communication between the image capture device and the computing device, and/or other information. Based on the communication between the image capture device and the computing device for a threshold duration of time (e.g., one device not receiving a signal from the other device for a threshold duration of time), the image capture device may be determined to be apart from the computing device.

The image capture device being apart from the computing device may be determined by the image capture device, the computing device, and/or other devices. The image capture device, the computing device, and/or other devices may use the communication between the image capture device and the computing device to determine when the image capture device becomes separated from the computing device (e.g., sufficiently far from the computing device that the image capture device is considered to be lost). The image capture device, the computing device, and/or other devices may monitor the communication between the communication between the image capture device and the computing device to determine when the image capture device becomes separated from the computing device.

Responsive to determination that the image capture device is apart from the computing device, one or more operations of the computing device may be changed. The operation(s) of the computing device may be changed to facilitate tracking of the image capture device.

In some implementations, the change(s) in the operation(s) of the computing device to facilitate tracking of the image capture device may include one or more changes in sound produced by the computing device. For example, the computing device may not be making any sound, and responsive to determination that the image capture device is apart from the computing device, the operation of the computing device may be changed to make sound (e.g., beeping noises). The computing device may be making sound, and responsive to determination that the image capture device is apart from the computing device, the operation of the computing device may be changed to make different sound (e.g., change from playing a song to making beeping noises). The sound produced by the computing device may alert the user that the image capture device is apart from the computing device.

In some implementations, the change(s) in the operation(s) of the computing device to facilitate tracking of the image capture device may include vibration of the computing device. Responsive to determination that the image capture device is apart from the computing device, the operation of the computing device may be changed to cause the computing device to vibrate. The vibration of the computing device may alert the user that the image capture device is apart from the computing device.

In some implementations, the change(s) in the operation(s) of the computing device to facilitate tracking of the image capture device may include one or more changes in information presented by the computing device. Responsive to determination that the image capture device is apart from the computing device, the operation of the computing device may be changed to present information on the image capture device becoming separated from the computing device. For example, the computing device may present, on one or more electronic display, a notification that the image capture device is no longer with the computing device, that the communication between the image capture device and the computing device has been lost/low, and/or that the computing device has been disconnected from the image capture device. Presentation of other information to indicate the image capture device is apart from the computing device is contemplated.

Responsive to determination that the image capture device is apart from the computing device, the operation of the computing device may be changed to present information on location of the image capture device. For example, the computing device may present, on one or more electronic display, information on the last known location of the image capture device. The last known location of the image capture device may include the location of the computing device at which the computing device last computed with the image capture device (e.g., last GPS location of the computing device where the computing device received a signal from the image capture device). The last known location of the image capture device may include the last location of the image capture device received by the computing device from the image capture device (e.g., last GPS location of the image capture device received from the image capture device).

In some implementations, the size/boundary/perimeter of the last known location of the image capture device may be determined based on the strength of the communication between the image capture device and the computing device. The strength of the communication between the image capture device and the computing device may determine the size/boundary/perimeter of the area that is marked on the map as the last known location of the image capture device. For example, higher strength of the communication may decrease the size/boundary/perimeter of the area that is marked on the map to be searched while lower strength of the communication may increase the size/boundary/perimeter of the area that is marked on the map to be searched.

The computing device may present information on other locations of the image capture device. For example, the computing device may track historical locations of the image capture device and show the historical locations on a map. The historical locations of the image capture device may include locations of the image capture device before it was lost/separated from the computing device. The historical locations of the image capture device may include locations traveled by the image capture device before it arrived at the last known location. The historical locations of the image capture device may include GPS locations of the image capture device received from the image capture device in the past. The historical locations of the image capture device may include GPS locations of the computing device where the computing device received signals from the image capture device in the past. Showing historical locations of the image capture device may help the user in following the path of the image capture device to locate the image capture device.

In some implementations, the last known location of the image capture device may be calculated based on location of the image capture device/computing device and motion of the image capture device/computing device. For example, the last known location of the image capture device may be calculated based the last GPS location of the computing device where the computing device received a signal from the image capture device/the last GPS location of the image capture device received from the image capture device, and the direction and speed with which the image capture device/computing device was moving from the last GPS location. The direction and speed with which the image capture device was moving may have been received from the image capture device by the computing device. The direction and speed with which the computing device was moving may be determined based one or more position sensors of the computing device. The last known location of the image capture device may be calculated as a potential location to which the image capture device ended up (e.g., landed).

Responsive to determination that the image capture device is apart from the computing device, one or more operations of the image capture device may be changed. The operation(s) of the image capture device may be changed to facilitate tracking of the image capture device. The operation(s) of the image capture device may be changed by the image capture device, the computing device, and/or other devices. For example, when the computing device determines that the image capture device is apart from the computing device, the computing device may send one or more commands to the image capture device to change the operation(s) of the image capture device. As another example, when the image capture device determines that the image capture device is apart from the computing device, the image capture device may change its operation(s).

In some implementations, the change(s) in the operation(s) of the image capture device to facilitate tracking of the image capture device may include one or more changes in sound produced by the image capture device. For example, the image capture device may not be making any sound, and responsive to determination that the image capture device is apart from the computing device, the operation of the image capture device may be changed to make sound (e.g., beeping noises). The image capture device may be making sound, and responsive to determination that the image capture device is apart from the computing device, the operation of the image capture device device may be changed to make different sound (e.g., changing from not making beeping noises to making beeping noises, change volume and/or frequency of sound made). The sound produced by the image capture device may help the user in locating the image capture device.

In some implementations, the change(s) in the operation(s) of the image capture device to facilitate tracking of the image capture device may include vibration of the image capture device. Responsive to determination that the image capture device is apart from the computing device, the operation of the image capture device may be changed to cause the image capture device to vibrate. The vibration of the image capture device may help the user in locating the image capture device.

In some implementations, the change(s) in the operation(s) of the image capture device to facilitate tracking of the image capture device may include one or more changes in information transmitted by the image capture device to the computing device. Information being transmitted by the image capture device to the computing device may be changed to help the user locate the image capture device and/or to extend the battery life of the image capture device. For example, the image capture device may not have been transmitting its GPS location to the computing device when the image capture device was separated from the computing device. The operation of the image capture device may be changed to start transmitting its GPS location to the computing device. When the GPS location of the image capture device is received by the computing device, the computing device may present information on the location of the image capture device (e.g., map marking the GPS location of the image capture device) on one or more electronic displays. As another example, the image capture device may have been live streaming a video feed to the computing device. The operation of the image capture device may be changed to stop the live streaming of the video feed.

In some implementations, the change(s) in the operation(s) of the image capture device to facilitate tracking of the image capture device may include one or more changes in media item capture by the image capture device. Media item capture may refer to capture of images, videos, sounds, and/or other media item by the image capture device. The media item capture by the image capture device may change from video capture to image capture. The image capture device may have been capturing a video when the image capture device was separated from the computing device. The operation of the image capture device may be changed to switch from capturing a video to not capturing any media items. The operation of the image capture device may be changed to switch from capturing a video to capturing one or more images instead. The rate at which the image(s) are captured by the image capture device when separated from the computing device may be slower than the rate at which the image capture device was capturing the video frame(s). The change in the operation of the image capture device from video capture to not capturing any media items or to image capture may extend the battery life of the image capture device. The image(s) captured by the image capture device during the image capture may be transmitted to the computing device. The image(s) captured by the image capture device may be transmitted to the computing device after communication (WiFi and/or Bluetooth communication) has been reestablished between the image capture device and the computing device. The transmitted image(s) may enable the user to see the view seen by the image capture device. The transmitted image(s) may help the user locate the image capture device. In some implementations, the image capture device may transmit a lower-resolution version of the image(s) captured by the image capture device.

The image(s) captured by the image capture device may be transmitted to the computing device regardless of whether images/video frames were previously being transmitted to the computing device. For example, prior to separation of the image capture device from the computing device, the image capture device may have been capturing a video without transmitting video frames of the captured video to the computing device (e.g., not providing a live view of the video capture to the computing device). Once the image capture device becomes separated from the computing device, the image capture device may switch to image capture and start transmitting the image(s) to the computing device (e.g., providing a live view of the image capture to the computing device). In addition to switching between capture modes, the image capture device may start transmitting/streaming image(s) to help the user locate the image capture device.

Figure 5:
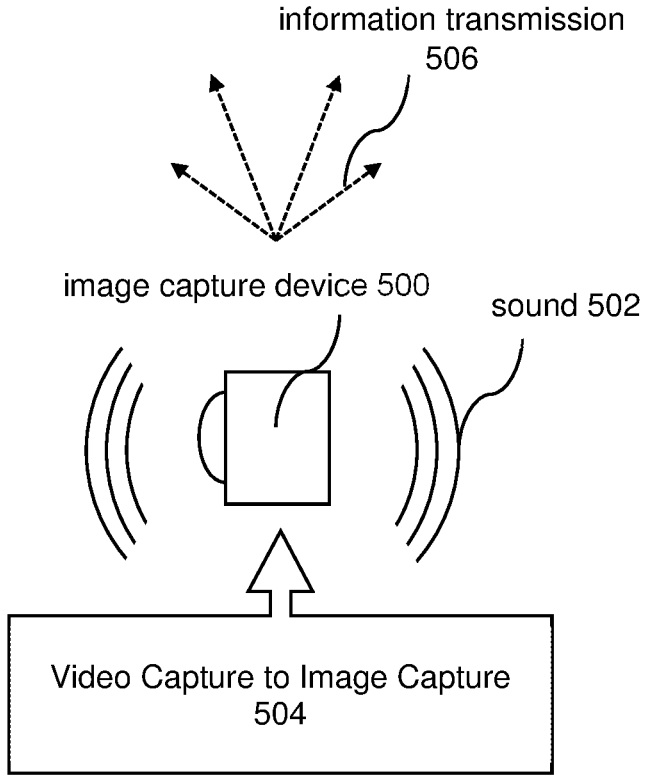
FIG. 5 illustrates example changes in the operation of an image capture device.

FIG. 5 illustrates example changes in the operation of an image capture device 500. When the image capture device 500 is apart from a computing device (e.g., a mobile device carried by a user), the operation of the image capture device 500 may be changed to facilitate tracking of the image capture device. For example, sound 502 produced by the image capture device 500 may be changed. The operation of the image capture device 500 may change from not producing sound to producing sound. The operation of the image capture device 500 may change to produce different sound. The capture of media items by the image capture device 500 may be changed. For example, the operation of the image capture device 500 may change from capturing a video to capturing image(s) 504. Information transmission 506 by the image capture device may be changed. For example, the operation of the image capture device 500 may change from not transmitting its GPS location to transmitting its GPS location. The operation of the image capture device 500 may change from live streaming to not live streaming.

The user's movement may bring the computing device closer to the image capture device. When the computing device gets closer to the image capture device, the communication between the image capture device and the computing device may be reestablished. Responsive to the communication between the image capture device and the computing device being reestablished, the computing device may alert the user (e.g., notification that the image capture device is nearby). Responsive to the communication between the image capture device and the computing device being reestablished, the image capture device may operate (e.g., beep, vibrate) to make its location known. Responsive to the communication between the image capture device and the computing device being reestablished, the computing device may present, on one or more electronic displays, information on how far the image capture device is from the computing device (e.g., live estimation of the distance between the image capture device and the computing device based on strength of the communication between the image capture device and the computing device) and/or information on whether the image capture device is getting closer or farther from the computing device (based on whether the strength of the communication between the image capture device and the computing device is increasing or decreasing).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the transceiver 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for tracking an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, a transceiver, and/or other components. The optical element may guide light within a field of view to the image sensor. The image sensor may generate a visual output signal conveying visual information based on light that becomes incident thereon. The visual information may define visual content. The transceiver may communicate with a computing device.

At operation 201, communication between the image capture device and the computing device may be established via the transceiver. The communication between the image capture device and the computing device may indicate proximity of the image capture device to the computing device.

At operation 202, the image capture device being apart from the computing device may be determined based on the communication between the image capture device and the computing device and/or other information.

At operation 203, responsive to determination that the image capture device is apart from the computing device, one or more operations of the image capture device may be changed to facilitate tracking of the image capture device.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device with tracking capability, the image capture device comprising:
  a housing;
  an optical element carried by the housing and configured to guide light within a field of view to an image sensor;
  the image sensor carried by the housing and configured to generate a visual output signal conveying visual information based on light that becomes incident thereon, the visual information defining visual content;
  a transceiver carried by the housing and configured to communicate with a mobile device carried by a user of the image capture device; and
  one or more physical processors carried by the housing and configured by machine-readable instructions to:
    establish, via the transceiver, communication between the image capture device and the mobile device, the communication between the image capture device and the mobile device indicating proximity of the image capture device to the mobile device;
  wherein:
    the image capture device being apart from the mobile device is determined based on a low signal strength of the communication between the image capture device and the mobile device or a loss of the communication between the image capture device and the mobile device; and
    responsive to determination that the image capture device is apart from the mobile device, an operation of the image capture device is changed to facilitate tracking of the image capture device.

2. The image capture device of claim 1, wherein the change in the operation of the image capture device to facilitate tracking of the image capture device includes:

a change in sound produced by the image capture device;

a change in information transmitted by the image capture device to the mobile device; and/or a change in media item capture by the image capture device.

3. An image capture device with tracking capability, the image capture device comprising:

a housing;

an optical element carried by the housing and configured to guide light within a field of view to an image sensor;

the image sensor carried by the housing and configured to generate a visual output signal conveying visual information based on light that becomes incident thereon, the visual information defining visual content;

a transceiver carried by the housing and configured to communicate with a computing device; and one or more physical processors carried by the housing and configured by machine-readable instructions to:

establish, via the transceiver, communication between the image capture device and the computing device, the communication between the image capture device and the computing device indicating proximity of the image capture device to the computing device;

wherein:

the image capture device being apart from the computing device is determined based on the communication between the image capture device and the computing device; and responsive to determination that the image capture device is apart from the computing device, an operation of the image capture device is changed to facilitate tracking of the image capture device.

4. The image capture device of claim 3, wherein the communication between the image capture device and the computing device includes Bluetooth communication.

5. The image capture device of claim 3, wherein the image capture device is determined to be apart from the computing device based on a low signal strength of the communication between the image capture device and the computing device or a loss of the communication between the image capture device and the computing device.

6. The image capture device of claim 3, wherein the computing device includes a mobile device carried by a user of the image capture device.

7. The image capture device of claim 3, wherein the change in the operation of the image capture device to facilitate tracking of the image capture device includes a change in sound produced by the image capture device.

8. The image capture device of claim 3, wherein the change in the operation of the image capture device to facilitate tracking of the image capture device includes a change in information transmitted by the image capture device to the computing device.

9. The image capture device of claim 3, wherein the change in the operation of the image capture device to facilitate tracking of the image capture device includes a change in media item capture by the image capture device.

10. The image capture device of claim 9, wherein the media item capture by the image capture device changes from video capture to image capture.

11. The image capture device of claim 10, wherein one or more images captured by the image capture device during the image capture are transmitted to the computing device.

12. A method for utilizing an image capture device with tracking capability, the method performed by an image capture device including an optical element, an image sensor, a transceiver, and one or more processors, the optical element configured to guide light within a field of view to the image sensor, the image sensor configured to generate a visual output signal conveying visual information based on light that becomes incident thereon, the visual information defining visual content, the transceiver configured to communicate with a computing device, the method comprising:

establishing, via the transceiver, communication between the image capture device and the computing device, the communication between the image capture device and the computing device indicating proximity of the image capture device to the computing device;

wherein:

the image capture device being apart from the computing device is determined based on the communication between the image capture device and the computing device; and responsive to determination that the image capture device is apart from the computing device, an operation of the image capture device is changed to facilitate tracking of the image capture device.

13. The method of claim 12, wherein the communication between the image capture device and the computing device includes Bluetooth communication.

14. The method of claim 12, wherein the image capture device is determined to be apart from the computing device based on a low signal strength of the communication between the image capture device and the computing device or a loss of the communication between the image capture device and the computing device.

15. The method of claim 12, wherein the computing device includes a mobile device carried by a user of the image capture device.

16. The method of claim 12, wherein the change in the operation of the image capture device to facilitate tracking of the image capture device includes a change in sound produced by the image capture device.

17. The method of claim 12, wherein the change in the operation of the image capture device to facilitate tracking of the image capture device includes a change in information transmitted by the image capture device to the computing device.

18. The method of claim 12, wherein the change in the operation of the image capture device to facilitate tracking of the image capture device includes a change in media item capture by the image capture device.

19. The method of claim 18, wherein the media item capture by the image capture device changes from video capture to image capture.

20. The method of claim 19, wherein one or more images captured by the image capture device during the image capture are transmitted to the computing device.

* * * * *